(12) United States Patent
Schmidt et al.

(10) Patent No.: US 7,776,138 B2
(45) Date of Patent: Aug. 17, 2010

(54) REMOVAL OF CONTAMINANTS FROM GAS STREAMS

(75) Inventors: Roland Schmidt, Bartlesville, OK (US); Robert W. Morton, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 268 days.

(21) Appl. No.: 12/137,639

(22) Filed: Jun. 12, 2008

(65) Prior Publication Data

US 2009/0311156 A1     Dec. 17, 2009

(51) Int. Cl.
*B01D 53/48* (2006.01)
*B01J 20/10* (2006.01)
*B01J 20/34* (2006.01)

(52) U.S. Cl. .............. 95/136; 95/148; 95/900; 423/230; 208/225; 208/245

(58) Field of Classification Search ............ 95/107, 95/136, 148, 900, 902; 423/220, 230, 244.01; 585/820, 826; 502/400, 407; 208/208 R, 208/225, 245
See application file for complete search history.

(56) References Cited

U.S. PATENT DOCUMENTS

| 2,040,867 | A | | 5/1936 | Mitchell et al. |
|---|---|---|---|---|
| 3,416,019 | A | | 12/1968 | Kaduk |
| 4,081,400 | A | | 3/1978 | Gorin |
| 4,871,521 | A | * | 10/1989 | Pendergraft ................ 423/230 |
| 5,726,117 | A | | 3/1998 | Khare et al. |
| 5,972,835 | A | | 10/1999 | Gupta |
| 2003/0118495 | A1 | | 6/2003 | Khare et al. |
| 2004/0140244 | A1 | * | 7/2004 | Sughrue et al. ............... 208/15 |
| 2009/0193969 | A1 | * | 8/2009 | Schmidt et al. ............... 95/148 |
| 2009/0196808 | A1 | * | 8/2009 | Morton et al. ............. 423/230 |
| 2009/0196809 | A1 | * | 8/2009 | Schmidt et al. ............ 423/230 |

* cited by examiner

*Primary Examiner*—Frank M Lawrence

(57) ABSTRACT

A process for the removal of contaminants from a gas stream is disclosed. A gas stream is contacted with a chlorine-containing compound to form a mixed gas stream. The mixed gas stream is then contacted with a sorbent in a sorption zone to produce a product gas stream and a sulfur laden sorbent, wherein the sorbent comprises zinc and a promoter metal.

25 Claims, 2 Drawing Sheets

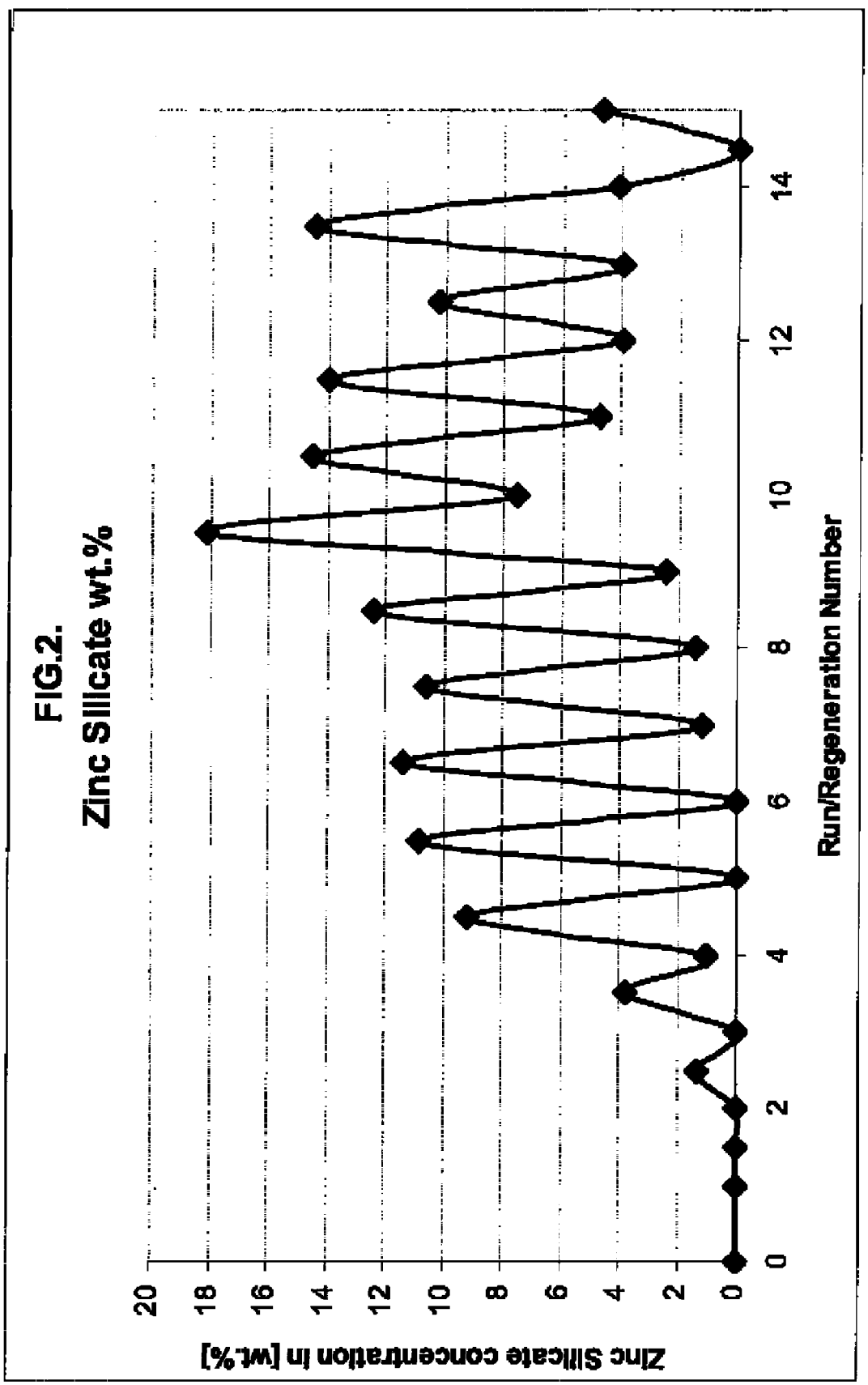

REMOVAL OF CONTAMINANTS FROM GAS STREAMS

FIELD OF THE INVENTION

The present invention relates generally to contaminant removal from gas streams. In another aspect, the present invention relates to a process for removing one or more contaminants from a gas stream via contact with a regenerable sorbent.

BACKGROUND OF THE INVENTION

In recent years, the demand for natural gas and other gas-phase fuels has increased substantially. At the same time, stricter regulations concerning allowable levels of certain components (e.g., sulfur species, acid gases, and other compounds of environmental concern) have been imposed, prompting fuel gas producers to develop economical methods of producing a compliant gas product.

One known method of treating a gas stream to remove undesirable components is to contact the gas stream with a physical or chemical solvent. Examples of chemical solvents include amines such as methyldiethanolamine (MDEA) and diethanolamine (DEA). Often, the selectivity of the chemical solvents can be problematic. For example, while amines are capable of efficiently removing hydrogen sulfide ($H_2S$) from gas streams, the amines are generally not capable of absorbing other undesirable sulfur-containing compounds, such as, for example carbonyl sulfide (COS). As a result, additional process steps (e.g., COS hydrolysis) must be carried out before the gas stream can be used as fuel. In addition to removing $H_2S$, most amines also remove carbon dioxide, which can place unnecessary processing loads on subsequent waste gas facilities. Further, most processes utilizing chemical solvents require extensive cooling of the incoming gas stream and often use large volumes of stream to remove absorbed contaminants from the solvent, which make these processes energy-intensive. Physical solvent-based processes are also highly energy-intensive and often require high operating pressures and/or low operating temperatures.

It has been discovered that a sorbent can be used to treat gas streams. One example of a sorbent that can be used is a sorbent comprising zinc, a promoter metal, and silica. However, if moisture contacts the sorbent, there is a chance that silicates will form. If silicate formation cannot be controlled or at least limited, then the sorbent would lose most of its sulfur-scrubbing activity. Excessive loss of activity would necessitate frequent sorbent replacement, rendering the combined technology commercially unviable.

Accordingly, a need exists for a process for limiting the formation of silicates when using a sorbent to remove contaminants from a gas stream.

SUMMARY OF THE INVENTION

In one embodiment of the present invention, there is provided a process comprising, consisting of or consisting essentially of:

a) contacting a gas stream comprising $H_2S$ with a chlorine-containing compound to form a mixed gas stream;

b) contacting said mixed gas stream with a sorbent in a sorption zone to produce a first product gas stream and a sulfur laden sorbent, wherein said sorbent comprises a metal selected from the group consisting of zinc, silica, and a promoter metal;

c) drying at least a portion of said sulfur-laden sorbent to thereby provide a dried sulfur-laden sorbent;

d) contacting at least a portion of said dried sulfur laden sorbent with a regeneration gas stream in a regeneration zone to produce a regenerated sorbent comprising a zinc-containing compound, a silicate, and a promoter metal, and an off-gas stream;

e) returning said regenerated sorbent to said sorption zone to provide a renewed sorbent comprising zinc, silica, and a promoter metal; and f) contacting said regenerated sorbent with said mixed gas stream in said sorption zone to form a second product gas stream and a sulfur laden sorbent.

BRIEF DESCRIPTION OF THE FIGURES

FIG. 2 is a plot of the run/regeneration number vs. the zinc silicate concentration in weight percent.

DETAILED DESCRIPTION OF THE INVENTION

Figure 1:
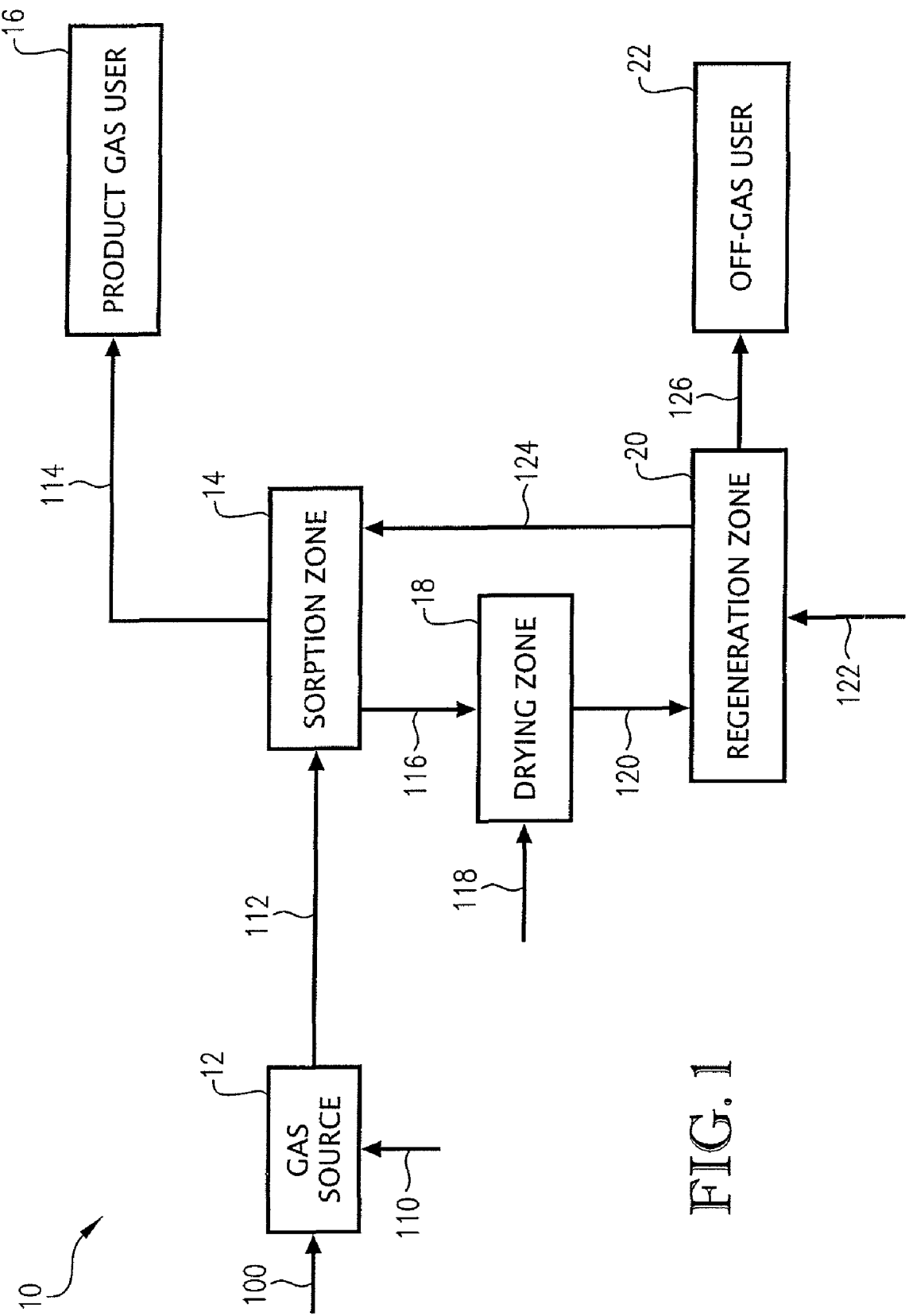
FIG. 1 is a schematic diagram of a contaminant removal system in accordance with one embodiment of the present invention.

Referring to FIG. 1, a contaminant removal system 10 is illustrated as generally comprising a gas source 12, a sorption zone 14, a product gas user 16, a drying zone 18, a regeneration zone 20, and an off-gas user 22. In general, a raw gas stream exiting gas source 12 can be contacted with a sorbent in sorption zone 14 to thereby remove one or more contaminants from the gas stream. The resulting, contaminant-depleted product gas stream exiting sorption zone 14 can be routed to product gas user 16, while at least a portion of the contaminant-laden sorbent can be dried in drying zone 18 prior to being regenerated via contact with a regeneration gas in regeneration zone 20. The resulting off-gas stream exiting regeneration zone 20 can be routed to off-gas user 22, while at least a portion of the regenerated sorbent can then be returned to sorption zone 14 for subsequent reuse. In one embodiment, at least one of the sorption, drying, and regeneration zones 14, 18, 20 can be contained within the same process vessel. In another embodiment, at least one of the sorption, drying, and regeneration zones 14, 18, 20 can be contained in two or more separate process vessels. Further, the contaminant removal system 10 depicted in FIG. 1 can be operated in continuous, semi-continuous, semi-batch, or batch mode. The operation of contaminant removal system 10 will now be described in more detail below.

Gas source 12 can comprise any source or system capable of producing a gas stream. In general, the raw gas stream produced from gas source 12 can have a vapor fraction greater than about 0.8, greater than about 0.9, or greater than 0.95 at standard conditions. In one embodiment, the raw gas stream from gas source 12 can comprise less than about 1 volume percent, less than about 0.5 volume percent, less than 0.05 volume percent, or less than 500 parts per million by volume (ppmv) of $C_6+$ hydrocarbon material. For example, gas source 12 can comprise a natural gas well, a refinery or chemical plant process stream, or any other suitable source.

In one embodiment, gas source 12 can comprise a gasification system operable to produce a raw gas stream via the gasification of a solid-based carbon-containing material, such as, for example, coal or petroleum coke. Typically, the solid carbon-containing material can be gasified via contact with a gasification stream comprising stream, oxygen, air, hydrogen, carbon dioxide, or any combination thereof. In one embodiment, a slurry of solid carbon-containing material in conduit 100 can be gasified via contact with an oxygen-containing stream entering gas source 12 via conduit 110 at a temperature in the range of from about 530 to about 1950° C., about 810 to about 1650° C., or 950 to 1510° C. and a pressure in the range of from about 150 to about 800 pounds-per-square inch, gauge (psig), about 250 to about 700 psig, or 300 to 600 psig.

The raw gas stream exiting gas source 12 via conduit 112 can comprise one or more of the following compounds: carbon monoxide (CO), carbon dioxide ($CO_2$), hydrogen ($H_2$), water ($H_2O$), propane and lighter hydrocarbons ($C_3$+), nitrogen ($N_2$), and the like. Additionally, the raw gas stream can comprise one or more undesirable components (i.e., contaminants) that should be removed prior to utilizing the raw gas stream as fuel. Sulfur compounds, such as, for example, hydrogen sulfide ($H_2S$), carbonyl sulfide (COS), carbon disulfide ($CS_2$), and even organosulfur compounds such as mercaptans and various thiophenic compounds are a few examples of common contaminants found in the raw gas stream. Other examples of contaminants typically present in the raw gas stream can include, but are not limited to ammonia ($NH_3$), hydrochloric acid (HCl), and hydrogen cyanide (HCN). Table 1, below, summarizes the composition of the raw gas stream in conduit 112 according to one embodiment of the present invention.

TABLE 1

| Component | Component in Raw Gas Stream (based on total stream volume) | | |
|---|---|---|---|
| | Broad Range | Intermediate Range | Narrow Range |
| $H_2$ | 8-50 vol % | 10-40 vol % | 15-35 vol % |
| CO | 10-75 vol % | 15-60 vol % | 25-50 vol % |
| $CO_2$ | 1-40 vol % | 5-30 vol % | 7-20 vol % |
| $H_2O$ | 4-40 vol % | 8-30 vol % | 10-25 vol % |
| $H_2S$ | 0.001-5 vol % | 0.1-2.5 vol % | 0.5-2 vol % |
| $CH_4$ | 0.05-10 vol % | 0.1 to 7.5 vol % | 0.5 to 5.0 vol % |
| COS | 100-5,000 ppmv | 200-2,500 ppmv | 350-1,500 ppmv |
| HCl | 50-2,000 ppmv | 100-1,500 ppmv | 250-1,000 ppmv |
| $NH_3$ | 50-2,000 ppmv | 100-1,500 ppmv | 250-1,000 ppmv |
| Other (total) | <2.5 vol % | <2.0 vol % | <1 vol % |

In one embodiment, an additional amount of a chlorine-containing compound can be added to the raw gas stream before it enters gas source 12. The chlorine-containing compound can be selected from the group consisting of HCl, an organochloride compound, and combinations thereof. Examples of organochloride compounds that can be used include, but are not limited to monochloroethane, dichloroethane, trichloroethane, methylchloride, dichloromethane, trichloromethane, tetrachloromethane, monochloroethene, dichloroethene, trichloroethene, and trichlorobenzene.

In an embodiment, the chlorine-containing compound is present in the raw gas stream in an amount in the range of from about 1 ppmv to about 3 volume percent. The chlorine-containing compound can also be present in the raw gas stream in an amount in the range of from about 50 ppmv to about 1 volume percent. The chlorine-containing compound can also be present in the raw gas stream in an amount in the range of from 100 ppmv to 1000 ppmv.

As depicted in FIG. 1, at least a portion of the raw gas stream exiting gas source 12 in conduit 112 can be routed into sorption zone 14, wherein the stream can be contacted with a sorbent to remove at least a portion of at least one contaminant from the incoming gas stream. In one embodiment, the raw gas stream is not cooled prior to entering sorption zone 14 and can have a temperature that is within about 200° C., about 100° C., or 50° C. of the temperature of the raw gas stream exiting gas source 12. Generally, the raw gas stream entering sorption zone 14 can have a temperature in the range of from about 150 to about 700° C., about 250 to about 600° C., or 350 to 450° C. and a pressure in the range of from about 100 to about 750 psig, about 250 to about 600 psig, or 350 to 450 psig.

In general, the sorbent employed in sorption zone 14 can be any sufficiently regenerable zinc-oxide-based sorbent composition having sufficient contaminant removal ability. While described below in terms of its ability to remove sulfur contaminants from an incoming tail gas stream, it should be understood that the sorbent of the present invention can also have significant capacity to remove one or more other contaminants.

In one embodiment of the present invention, the sorbent employed in sorption zone 14 can comprise zinc and a promoter metal component. The promoter metal component can comprise one or more promoter metals selected from the group consisting of nickel, cobalt, iron, manganese, tungsten, silver, gold, copper, platinum, zinc, tine, ruthenium, molybdenum, antimony, vanadium, iridium, chromium, palladium, and mixtures thereof. In one embodiment, at least a portion of the promoter metal component is present in a reduced-valence state. The valence reduction of the promoter metal component can be achieved by contacting the sorbent with a reducing agent within sorption zone 14 and/or prior to introduction into sorption zone 14. Any suitable reducing agent can be used, including, but not limited to hydrogen and carbon monoxide.

In one embodiment of the present invention, the reduced-valence promoter metal component can comprise, consist of, or consist essentially of, a substitutional solid metal solution characterized by the formula: $M_A Zn_B$, wherein M is the promoter metal and A and B are each numerical values in the range of from about 0.01 to about 0.99. In the above formula for the substitutional solid metal solution, A can be in the range of from about 0.70 to about 0.98 or 0.85 to 0.95 and B can be in the range of from about 0.03 to about 0.30 or 0.05 to 0.15. In one embodiment, A+B=1.

Substitutional solid solutions are a subset of alloys that are formed by the direct substitution of the solute metal for the solvent metal atoms in the crystal structure. For example, it is believed that the substitutional solid metal solution $M_A Zn_B$ is formed by the solute zinc metal atoms substituting for the solvent promoter metal atoms. Three basic criteria exist that favor the formation of substitutional solid metal solutions: (1) the atomic radii of the two elements are within 15 percent of each other; (2) the crystal structures of the two pure phases are the same; and (3) the electronegativities of the two components are similar. The promoter metal (as the elemental metal or metal oxide) and zinc (as the elemental metal or metal oxide) employed in the sorbent described herein typically meet at least two of the three criteria set forth above. For example, when the promoter metal is nickel, the first and third criteria, are met, but the second is not. The nickel and zinc metal atomic radii are within 10 percent of each other and the electronegativities are similar. However, nickel oxide (NiO) preferentially forms a cubic crystal structure, while zinc oxide (ZnO) prefers a hexagonal crystal structure. A nickel zinc solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in an approximate 92:8 nickel zinc solid solution ($Ni_{0.92} Zn_{0.08}$)

that is formed during reduction and microscopically in the repeated regenerability of sorbent.

In addition to zinc and the promoter metal, the sorbent employed in sorption zone 14 can further comprise silica and an aluminate. The aluminate can comprise a promoter metal-zinc aluminate substitutional solid solution characterized by the formula: $M_ZZn_{(1-Z)}Al_2O_4$, wherein M is the promoter metal and Z is in the range of from 0.01 to 0.99. Any silica-containing compound which ultimately increases the macroporosity of the sorbent can be used. In one embodiment, the porosity enhancer can comprise perlite. Examples of sorbents suitable for use in sorption zone 14 and methods of making these sorbents are described in detail in U.S. Pat. Nos. 6,429,170 and 7,241,929, the entire disclosures of which are incorporated herein by reference.

Table 2, below, provides the composition of a sorbent employed in sorption zone 14 according to an embodiment of the present invention where reduction of the sorbent is carried out prior to introduction of the sorbent into sorption zone 14.

TABLE 2

| Range | Reduced Sorbent Composition (wt %) | | | |
|---|---|---|---|---|
| | ZnO | $M_AZn_B$ | PE | $M_ZZn_{(1-Z)}Al_2O_4$ |
| Broad | 10-90 | 5-80 | 2-50 | 2-50 |
| Intermediate | 20-60 | 10-60 | 5-30 | 5-30 |
| Narrow | 30-40 | 30-40 | 10-20 | 10-20 |

In an alternative embodiment where the sorbent is not reduced prior to introduction into sorption zone 14, the promoter metal component can comprise a substitutional solid metal oxide solution characterized by the formula $M_XZn_YO$, wherein M is the promoter metal and X and Y are in the range of from about 0.01 to about 0.99. In one embodiment, X can be in the range of from about 0.5 to about 0.9, about 0.6 to about 0.8, or 0.65 to 0.75 and Y can be in the range of from about 0.10 to about 0.5, about 0.2 to about 0.4, or 0.25 to 0.35. In general, X+Y=1.

Table 3, below, provides the composition of an unreduced sorbent employed in sorption zone 14 according to an embodiment where the sorbent is not reduced prior to introduction into sorption zone 14.

TABLE 3

| Range | Unreduced Sorbent Composition (wt %) | | | |
|---|---|---|---|---|
| | ZnO | $M_XZn_YO$ | PE | $M_ZZn_{(1-Z)}Al_2O_4$ |
| Broad | 10-90 | 5-70 | 2-50 | 2-50 |
| Intermediate | 20-70 | 10-60 | 5-30 | 5-30 |
| Narrow | 35-45 | 25-35 | 10-20 | 10-20 |

As mentioned above, when an unreduced sorbent composition is contacted with a hydrogen containing compound in sorption zone 14, reduction of the sorbent can take place in sorption zone 14. Therefore, when sorbent reduction takes place in sorption zone 14, the initial sorbent contacted with the raw gas stream in sorption zone 14 can be a mixture of reduced sorbent (Table 2) and unreduced sorbent (Table 3).

In general, the incoming raw gas stream can contact the initial sorbent in sorption zone 14 at a temperature in the range of from about 150° C. to about 650° C., about 225° C. to about 550° C., or 325° C. to 475° C. and a pressure in the range of from about 100 to about 750 psig, about 250 to 575 psig, or 350 to 450 psig. At least a portion of sulfur-containing compounds (and/or other contaminants) in the raw gas stream can be sorbed by the sorbent, thereby creating a sulfur-depleted product gas stream and a sulfur-laden sorbent. In one embodiment, sulfur-removal efficiency of sorption zone 14 can be greater than about 85 percent, greater than about 90 percent, greater than about 95 percent, greater than about 98 percent, or greater than 99 percent. As depicted in FIG. 1, at least a portion of the contaminant-depleted product gas stream can exit sorption zone 14 via conduit 114. In one embodiment, the product gas stream can comprise less than about 50, less than about 20, less than about 10, less than about 5, or less than 1 ppmv $H_2S$.

As shown in FIG. 1, the contaminant-depleted product gas stream can then be routed to a product gas user 16. Product gas user 16 can comprise any industrial, commercial, or residential use or application of a contaminant-depleted product gas stream. In one embodiment, product gas user 16 can comprise an industrial gas turbine located in a facility used to co-produce stream and electricity.

As depicted in FIG. 1, at least a portion of the sulfur-laden sorbent discharged from sorption zone 14 can be routed to drying zone 18 via conduit 116. In one embodiment, the sulfur-laden sorbent can have a sulfur loading in the range of from about 0.1 to about 27, about 3 to about 26, about 5 to about 25, or 10 to 20 weight percent. In drying zone 18, at least a portion of the sulfur-laden sorbent can be dried by flowing an inert gas purge stream in conduit 118 having a temperature in the range of from about 100 to about 550° C., about 150 to about 500° C., or 200 to 475° C. through the sorbent for a time period of at least about 15 minutes, or a time period in the range of from about 30 minutes to about 100 hours, about 45 minutes to about 36 hours, or 1 hour to 12 hours. The resulting dried, sulfur-laden sorbent can then be routed to regeneration zone 20 via conduit 120, as illustrated in FIG. 1.

Regeneration zone 20 can employ a regeneration process capable of removing least a portion of the sulfur (or other sorbed contaminants) from the sulfur-laden sorbent via contact with a regeneration gas stream under sorbent regeneration conditions. In one embodiment, the regeneration gas stream entering regeneration zone 20 via conduit 122 can comprise an oxygen-containing gas stream, such as, for example, air (e.g., about 21 volume percent oxygen). In another embodiment, the regeneration gas stream in conduit 120 can be an oxygen-enriched gas stream comprising at least about 50, at least about 75, at least about 85, or at least 90 volume percent oxygen. In yet another embodiment, the regeneration gas stream can comprise a substantially pure oxygen stream.

According to one embodiment of the present invention, the regeneration process employed in regeneration zone 20 can be a step-wise regeneration process. In general, a step-wise regeneration process includes adjusting at least one regeneration variable from an initial value to a final value in two or more incremental adjustments (i.e., steps). Examples of adjustable regeneration variables can include, but are not limited to, temperature, pressure, and regeneration gas flow rate. In one embodiment, the temperature in regeneration zone 20 can be increased by a total amount that is at least about 75° C., at least about 100° C., or at least 150° C. above an initial temperature, which can be in the range of from about 250 to about 650° C., about 300 to about 600° C., or 350 to 550° C. In another embodiment, the regeneration gas flow rate can be adjusted so that the standard gas hourly space velocity (SGHSV) of the regeneration gas in contact with the sorbent can increase by a total amount that is at least about 1,000, at least about 2,500, at least about 5,000, or at least 10,000 volumes of gas per volume of sorbent per hour (v/v/h or $h^{-1}$) above an initial SGHSV value, which can be in the range of from about 100 to about 100,000 $h^{-1}$, about 1,000 to about 80,000 $h^{-1}$, or 10,000 to 50,000 $h^{-1}$.

In one embodiment, the size of the incremental adjustments (i.e., the incremental step size) can be in the range of from about 2 to about 50, about 5 to about 40, or 10 to 30 percent of magnitude of the desired overall change (i.e., the difference between the final and initial values). For example, if an overall temperature change of about 150° C. is desired, the incremental step size can be in the range of from about 3 to about 75° C., about 7.5 to about 60° C., or 15 to 45° C. In another embodiment, the magnitude of the incremental step size can be in the range of from about 2 to about 50, about 5 to about 40, or 10 to 30 percent of magnitude of the initial variable value. For example, if the initial regeneration temperature is 250° C., the incremental step size can be in the range of from about 5 to about 125° C., about 12.5 to about 100° C., or 25 to 75° C. In general, successive incremental steps can have the same incremental step sizes, or, alternatively, one or more incremental step sizes can be greater than or less than the incremental step size of the preceding or subsequent steps.

In one embodiment, subsequent adjustments to the regeneration variable(s) can be carried out at predetermined time intervals. For example, adjustments can be made after time intervals in the range of from about 1 minute to about 45 minutes, about 2 minutes to about 30 minutes, or 5 to 20 minutes. In another embodiment, the adjustments can be made based on the value(s) of one or more "indicator" variable(s). An indicator variable is a variable in the system monitored to determine the progress of the sorbent regeneration. Examples of indicator variables can include, but are not limited to, sorbent sulfur loading, regeneration sorbent bed temperature, regeneration zone temperature profile (i.e., exotherm), and off-gas stream composition. In one embodiment, the sulfur dioxide ($SO_2$) concentration in the off-gas stream is monitored to determine when the flow rate of the regeneration gas and/or the regeneration temperature should be incrementally adjusted.

The regeneration process can be carried out in regeneration zone 20 until at least one regeneration end point is achieved. In one embodiment, the regeneration end point can be the achievement of a desired value for one or more of the adjusted regeneration variables. For example, the regeneration process can be carried out until the temperature achieves a final value in the range of from about 300 to about 800° C., about 350 to about 750° C., or 400 to 700° C. or the SGHSV reaches a final value in the range of from about 1,100 to about 110,000 $h^{-1}$, about 5,000 to about 85,000 $h^{-1}$, or 25,000 to 60,000 $h^{-1}$. In another embodiment, the regeneration process can be finished after a predetermined number of variable adjustments. For example, the regeneration process can be carried out long enough for at least 1 or in the range of from about 2 to about 8 or 3 to 5 incremental adjustments to be made. In yet another embodiment, the regeneration process can be carried out until a final value of the selected indicator variable is achieved. For example, the regeneration process can be carried out until the concentration of $SO_2$ in the off-gas exiting regeneration zone 20 declines to a value less than about 1 volume percent, less than about 0.5 volume percent, less than about 0.1 volume percent, or less than 500 ppmv. Regardless of the specific endpoint selected, the entire length of the regeneration process can be less than about 100 hours, or in the range of from about 30 minutes to about 48 hours, about 45 minutes to about 24 hours, or 1.5 to 12.5 hours.

In one embodiment, the above-described regeneration process can have a regeneration efficiency of at least about 75 percent, at least about 85 percent, at least about 90 percent, at least about 95 percent, at least about 98 percent, or at least 99 percent. The regenerated sorbent can have a sulfur loading that is less than about 10 weight percent, or in the range of from about 0.05 to about 6 weight percent, or 0.1 to 4 weight percent.

While not wishing to be bound by theory, it is believed that if traces of moisture remain from the drying step, then there is a chance of silicate formation on the sorbent during the regeneration process. If silicates are present, sorbent degradation can occur.

As illustrated in FIG. 1, at least a portion of the regenerated sorbent in conduit 124 can then be returned to sorption zone 14. The regenerated sorbent comprises a zinc-containing compound, a silicate, and a promoter metal. As discussed above, in one embodiment, at least a portion of the regenerated sorbent does not undergo a reduction step prior to introduction into sorption zone. In such an embodiment, the regenerated but unreduced sorbent introduced into sorption zone 14 can comprise an unreduced promoter metal component that includes a substitutional solid metal oxide solution characterized by the formula $M_XZn_YO$ (See e.g., Table 3, above). While not wishing to be bound by theory, it is believed that silicates that were formed on the sorbent during the regeneration step can be converted to metal chlorides on the sorbent during the subsequent contacting phase due to the presence of a chlorine-containing compound in the raw gas stream. During subsequent regeneration cycles, the chlorine on the sorbent can form chlorine oxides.

Referring back to FIG. 1, the off-gas stream exiting regeneration zone 20 via conduit 126 can subsequently be routed to off-gas user 22. Off-gas user 22 can comprise any unit capable of processing the off-gas stream, such as, for example, a Claus sulfur processing unit. In one embodiment, the off-gas stream exiting regeneration zone 20 via conduit 126 can comprise at least about 5, at least about 10, at least about 20, or at least 25 volume percent $SO_2$. In one embodiment, the off-gas stream comprises less $H_2S$ than in the tail gas stream entering sorption zone 14 via conduit 112. In another embodiment, off-gas stream can comprise substantially no $H_2S$.

EXAMPLE

The following example is intended to be illustrative of the present invention and to teach one of ordinary skill in the art to make and use the invention. This example is not intended to limit the invention in any way.

A sorbent containing nickel, zinc, alumina, and perlite was crushed and sieved to obtain 100+/200-mesh size particles. About 20-30 grams of the crushed sorbent was combined with the same amount of alundum and the resulting mixture was charged to a fixed bed, downflow reaction vessel. Preheated HCl was added just before a raw gas stream entered the reactor. The raw gas stream, the composition of which is summarized in Table 4 below, was passed through the reaction vessel and contacted with the sorbent mixture at a temperature of 420° C. and a pressure of 408 psig. The simulated raw gas stream was diluted with nitrogen up to about 50 volume percent.

TABLE 4

| Typical Raw Gas Stream Composition | |
|---|---|
| Compound | Simulated Feed combined Experiments (absolute) [vol. %] |
| CO | 20.5 |
| $H_2$ | 13.7 |
| $CO_2$ | 8.5 |
| $H_2O$ | 9.3 |
| $H_2S$ | 1.0 |
| COS | 0 |
| HCl | 300 ppm |

TABLE 4-continued

Typical Raw Gas Stream Composition

| Compound | Simulated Feed combined Experiments (absolute) [vol. %] |
|---|---|
| $NH_3$ | 500 ppm |
| $N_2$ | 47 |

Water was removed from the depressurized gas before a slipstream was introduced to the analytical equipment which included an online mass spectrometer (ESS EcoSys Instrument), an online photoacoustics analyzer (INNOVA), and an online micro GC (manufactured by Agilent). The applied warm-gas conditions were 420° C. and a pressure of 400 psi. The stepwise regeneration procedure reached a temperature of 550° C. at atmospheric pressure. The sulfur-laden sorbent was regenerated using air. Prior to the actual regeneration, hot nitrogen was introduced to dry the sorbent at a temperature of 450° C. and ambient pressure to reduce the potential for zinc silicate formation. The regeneration process was a stepwise and alternating increase of temperature and air flow through the sorbent at atmospheric pressure. The regeneration process commenced immediately after the drying process. The temperature was increased stepwise from 450° C. to a final temperature of 550° C. in increments of about 30-50° C. The air flow through the sorbent increased from initially about 100 mL/min to about 1 L/min in steps of about 100 mL/min to about 250 mL/min, so that the gas hourly space velocity (GHSV) slowly increased.

An experiment with 15 cycles (absorption and regeneration) was conducted. In this experiment, fresh sorbent was not added in between cycles. A 300 ppmv quantity of HCl was added to the gas stream prior to contact with the sorbent. FIG. 2 shows the amount of cycles v. the silicate concentration on the sorbent. The high points are the silicate concentrations after regeneration. The low points are after the subsequent contacting phase.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above. As used herein, the terms "including," "includes," and "include" have the same open-ended meaning as "comprising," "comprises," and "comprise" provided above.

As used herein, the terms "having," "has," and "have" have the same open-ended meaning as "comprising," "comprises," and "comprise" provided above.

As used herein, the terms, "including," "include," and "included" have the same open-ended meaning as "comprising," "comprises," and "comprise" provided above.

As used herein, the term "indicator variable" refers to a variable monitored to determine the progress of the sorbent regeneration.

As used herein, the term "reduced-valence promoter metal component" refers to a promoter metal component having a valence with is less than the valence of the promoter metal component in its common oxidized state.

As used herein, the term "regeneration conditions" refer to conditions necessary to remove at least a portion of sorbed sulfur from the sulfur-laden sorbent.

As used herein, the term "regeneration efficiency" refers to the ability of a regeneration zone to remove one or more sorbed compounds from an incoming sorbent. Regeneration efficiency can be expressed according to the following formula: [(sulfur loading of sulfur-laden sorbent×mass of sulfur-laden sorbent entering regeneration zone)−(sulfur loading of regenerated sorbent×mass of regenerated sorbent exiting regeneration zone)/(sulfur loading of sulfur-laden sorbent× mass of sulfur-laden sorbent entering regeneration zone), expressed as a percentage.

As used herein, the term "sorb" refers to any type or combination of physical and/or chemical adsorption and/or absorption.

As used herein, the term "sorbent-damaging compound" refers to a compound sorbed into or onto the sorbent that adversely impacts the sorbent's ability to remove sulfur or other contaminants from a fluid stream.

As used herein, the term "standard conditions" refers to a pressure of 1 atmosphere and a temperature of 60° F.

As used herein, the term "standard gas hourly space velocity" or "SGHSV" refers to the gas hourly space velocity of a gas stream measured at standard conditions.

As used herein, the term "sulfur loading" refers to the average weight percent of sulfur sorbed onto a sorbent.

As used herein, the term "sulfur removal efficiency" refers to the ability of a sorbent to remove sulfur compounds or other contaminants from an incoming fluid stream. Sulfur removal efficiency can be calculated by the following formula: (mass flow rate of sulfur compounds entering a sorption zone in a fluid stream−mass flow rate of sulfur compounds exiting a sorption zone in a fluid stream)/(mass flow rate of sulfur compounds entering a sorption zone in the feed stream), expressed as a percentage.

CLAIMS NOT LIMITED TO THE DISCLOSED EMBODIMENTS

The preferred forms of the invention described above are to be used as illustration only, and should not be used in a limiting sense to interpret the scope of the present invention. Modifications to the exemplary embodiments, set forth That which is claimed is:

1. A process comprising;
   a) contacting a gas stream comprising $H_2S$ with a chlorine-containing compound to form a mixed gas stream;
   b) contacting said mixed gas stream with a sorbent in a sorption zone to produce a first product gas stream and a sulfur laden sorbent, wherein said sorbent comprises a zinc-containing compound, silica, and a promoter metal;
   c) drying at least a portion of said sulfur-laden sorbent to thereby provide a dried sulfur-laden sorbent;
   d) contacting at least a portion of said dried sulfur laden sorbent with a regeneration gas stream in a regeneration zone to produce a regenerated sorbent comprising a zinc-containing compound, a silicate, and a promoter metal, and an off-gas stream;
   e) returning said regenerated sorbent to said sorption zone to provide a renewed sorbent comprising zinc, silica, and a promoter metal; and
   f) contacting said renewed sorbent with said mixed gas stream in said sorption zone to form a second product gas stream and a sulfur laden sorbent.

2. A process in accordance with claim 1 wherein said promoter metal is nickel.

3. A process in accordance with claim 1, wherein said sorbent comprises a substitutional solid metal solution characterized by the formula $M_A Zn_B$, wherein M is said promoter metal, wherein A and B are in the range of from about 0.01 to about 0.99.

4. A process in accordance with claim 1, wherein said regenerated sorbent returned to said sorption zone in step (e) comprises a substitutional solid metal oxide solution characterized by the formula $M_X Zn_Y O$, wherein M is said promoter metal, wherein X and Y are in the range of from about 0.01 to about 0.99.

5. A process in accordance with claim 1, wherein said gas stream comprises in the range of from about 0.001 to about 5 volume percent $H_2S$.

6. A process in accordance with claim 1, wherein said product gas stream comprises less than 50 ppmv $H_2S$.

7. A process in accordance with claim 1 wherein said chlorine-containing compound is present in said mixed gas stream in an amount in the range of from about 1 ppmv to about 3 volume percent.

8. A process in accordance with claim 1 wherein said chlorine-containing compound is present in said mixed gas stream in an amount in the range of from about 50 ppmv to about 1 volume percent.

9. A process in accordance with claim 1 wherein said chlorine-containing compound is present in said mixed gas stream in an amount in the range of from 100 ppmv to 1000 ppmv.

10. A process in accordance with claim 1 wherein said gas stream further comprises compounds selected from the group consisting of carbon monoxide, hydrogen and combinations thereof.

11. A process in accordance with claim 1 wherein said sorbent is reduced with a reducing agent in a reduction zone prior to said contacting of said gas stream in step (a).

12. A process in accordance with claim 11 wherein said reducing agent comprises an agent selected from the group consisting of hydrogen and carbon monoxide.

13. A process in accordance with claim 1 wherein said gas stream further comprises a reducing agent.

14. A process in accordance with claim 13 wherein said reducing agent comprises an agent selected from the group consisting of hydrogen and carbon monoxide.

15. A process in accordance with claim 1 wherein conditions in said sorption zone include a temperature in the range of from about 150° C. to about 1000° C.

16. A process in accordance with claim 1 wherein conditions in said sorption zone include a temperature in the range of from about 250° C. to about 700° C.

17. A process in accordance with claim 1 wherein conditions in said sorption zone include a temperature in the range of from about 350° C. to about 550° C.

18. A process in accordance with claim 1 wherein conditions in said sorption zone include a pressure in the range of from about atmospheric pressure to about 5000 psig.

19. A process in accordance with claim 1 wherein conditions in said sorption zone include a pressure in the range of from about atmospheric pressure to about 1000 psig.

20. A process in accordance with claim 1 wherein conditions in said regeneration zone includes a regeneration gas stream.

21. A process in accordance with claim 20 wherein said regeneration gas stream comprises oxygen.

22. A process in accordance with claim 20 wherein said regeneration gas stream comprises air.

23. A process in accordance with claim 1 wherein said off-gas stream comprises $H_2S$.

24. A process in accordance with claim 23 wherein said offgas stream is recycled to a $SO_2$ treatment zone.

25. A process in accordance with claim 24 wherein said $SO_2$ treatment zone comprises a Claus unit.

* * * * *